(12) United States Patent
Üyünük et al.

(10) Patent No.: US 11,541,529 B2
(45) Date of Patent: Jan. 3, 2023

(54) WIND TURBINE BLADE ROTATING DEVICE—STRAPPED TIP DEVICE WITH BLADE STABILIZATION SYSTEM

(71) Applicant: TPI Composites, Inc., Warren, RI (US)

(72) Inventors: Mehmet Üyünük, Izmir (TR); Furkan Ünal, Izmir (TR)

(73) Assignee: TPI Composites, Inc., Warren, RI (US)

( * ) Notice: Subject to any disclaimer, the term of this patent is extended or adjusted under 35 U.S.C. 154(b) by 93 days.

(21) Appl. No.: 17/114,008

(22) Filed: Dec. 7, 2020

(65) Prior Publication Data
US 2021/0086345 A1  Mar. 25, 2021

Related U.S. Application Data (63) Continuation of application No. 16/373,344, filed on Apr. 2, 2019, now Pat. No. 10,857,663.
(Continued)

(51) Int. Cl.
*B25H 1/00* (2006.01)
*F03D 13/40* (2016.01)
(Continued)

(52) U.S. Cl.
CPC ............. *B25H 1/005* (2013.01); *B25B 1/205* (2013.01); *B60P 3/40* (2013.01); *F03D 13/40* (2016.05);
(Continued)

(58) Field of Classification Search
CPC .......... B25H 1/005; B60P 3/40; F03D 13/40; F16M 11/10; F16M 11/18; F16M 11/38;
(Continued)

(56) References Cited

U.S. PATENT DOCUMENTS

| | | | |
|---|---|---|---|
| 3,402,904 | A | 9/1968 | Paraskewik |
| 3,430,981 | A | 3/1969 | Tarantola |

(Continued)

FOREIGN PATENT DOCUMENTS

| | | |
|---|---|---|
| CN | 104421097 A | 3/2015 |
| CN | 205336053 U | 6/2016 |

(Continued)

OTHER PUBLICATIONS

International Search Report and Written Opinion for International Application No. PCT/US2019/025425 dated Jun. 24, 2019.
(Continued)

*Primary Examiner* — Ko H Chan
(74) *Attorney, Agent, or Firm* — Stephen J. Kenny; Vincenzo DiMonaco; Foley Hoag LLP (57) ABSTRACT

A wind turbine blade suspension and rotation device capable of raising and lowering the blade includes a blade housing configured to receive a blade and having at least one guide on an exterior surface; a base; a first telescopic frame disposed on a first side of the base; a second telescopic frame disposed on a second side of the base; at least one adjustable strap, the adjustable strap disposed between the adjustable frames; wherein the at least one strap extends through the guide on the exterior surface of the housing to suspend the blade.

17 Claims, 11 Drawing Sheets

Related U.S. Application Data (60) Provisional application No. 62/651,588, filed on Apr. 2, 2018, provisional application No. 62/651,581, filed on Apr. 2, 2018, provisional application No. 62/651,601, filed on Apr. 2, 2018, provisional application No. 62/651,586, filed on Apr. 2, 2018.

(51) Int. Cl.

| | | |
|---|---|---|
| *F16M 11/10* | (2006.01) | |
| *F16M 11/18* | (2006.01) | |
| *F16M 11/38* | (2006.01) | |
| *F16M 11/42* | (2006.01) | |
| *B60P 3/40* | (2006.01) | |
| *B25B 1/20* | (2006.01) | |
| *B62B 5/00* | (2006.01) | |

(52) U.S. Cl.
CPC ............ *F16M 11/10* (2013.01); *F16M 11/18* (2013.01); *F16M 11/38* (2013.01); *F16M 11/42* (2013.01); *B62B 5/003* (2013.01); *B62B 5/0033* (2013.01); *F05B 2240/941* (2013.01); *F05B 2260/02* (2013.01); *F05B 2260/30* (2013.01); *F16M 2200/022* (2013.01); *F16M 2200/028* (2013.01)

(58) Field of Classification Search
CPC ............ F16M 11/42; F16M 2200/022; F16M 2200/028; B62B 5/003; B62B 5/0033; B62B 2203/74; B62B 5/0086; F05B 2240/941; F05B 2260/02; F05B 2260/30; Y02E 10/72
See application file for complete search history.

(56) References Cited

U.S. PATENT DOCUMENTS

| | | | |
|---|---|---|---|
| 4,243,350 A | 1/1981 | Hall | |
| 5,251,893 A | 10/1993 | Schoenhenz | |
| 5,885,040 A | 3/1999 | Parker | |
| 7,303,365 B2 | 12/2007 | Wobben | |
| 7,670,090 B1 | 3/2010 | Landrum et al. | |
| 7,967,536 B2* | 6/2011 | Broderick | F03D 13/40 |
| | | | 410/44 |
| 8,313,272 B2* | 11/2012 | Koike | F03D 13/40 |
| | | | 410/44 |
| 8,632,286 B2 | 1/2014 | Wessel et al. | |
| 8,708,625 B1 | 4/2014 | Landrum et al. | |
| 8,753,050 B2* | 6/2014 | Cyrus | B60P 3/40 |
| | | | 410/44 |
| 9,004,843 B2 | 4/2015 | Lemos et al. | |
| 9,347,426 B2 | 5/2016 | Landrum et al. | |
| 9,429,139 B2* | 8/2016 | Johnson | B60P 3/40 |
| 9,638,162 B1 | 5/2017 | Fletcher et al. | |
| 9,945,351 B2* | 4/2018 | Lulker | F03D 13/40 |
| 10,857,663 B2 | 12/2020 | Üyünük et al. | |
| 11,027,412 B2 | 6/2021 | Uyunuk et al. | |
| 2006/0251517 A1* | 11/2006 | Grabau | F03D 1/0633 |
| | | | 416/202 |
| 2009/0020445 A1 | 1/2009 | Koike | |
| 2009/0169323 A1 | 7/2009 | Livingston | |
| 2011/0008147 A1 | 1/2011 | Lemos et al. | |
| 2011/0031292 A1 | 2/2011 | Krogh et al. | |
| 2011/0142589 A1 | 6/2011 | ten Thoren | |
| 2012/0124833 A1 | 5/2012 | Arendt et al. | |
| 2013/0104376 A1 | 5/2013 | Pedersen | |
| 2013/0119002 A1* | 5/2013 | Frederiksen | A47F 7/0021 |
| | | | 211/60.1 |
| 2013/0315685 A1 | 11/2013 | Pedersen et al. | |
| 2014/0103277 A1 | 4/2014 | Cormack | |
| 2014/0356113 A1 | 12/2014 | Schmidt et al. | |
| 2014/0369779 A1 | 12/2014 | Randall | |
| 2015/0028610 A1 | 1/2015 | Hansen et al. | |
| 2015/0144761 A1 | 5/2015 | Davi et al. | |
| 2015/0329036 A1 | 11/2015 | Johnson et al. | |
| 2015/0337799 A1 | 11/2015 | Hansen et al. | |
| 2016/0302545 A1 | 10/2016 | Berger | |
| 2018/0118538 A1 | 5/2018 | Latvys | |
| 2018/0223811 A1 | 8/2018 | Fletcher et al. | |
| 2019/0299393 A1 | 10/2019 | Uyunuk et al. | |
| 2021/0086345 A1 | 3/2021 | Uyunuk et al. | |
| 2021/0291350 A1 | 9/2021 | Uyunuk et al. | |

FOREIGN PATENT DOCUMENTS

| | | | |
|---|---|---|---|
| CN | 108423399 A | 8/2018 | |
| DE | 10211357 A1 | 9/2002 | |
| DE | 202016100449 U1 | 5/2017 | |
| EP | 2584191 A1 | 4/2013 | |
| EP | 2708731 A2 | 3/2014 | |
| EP | 3046803 A1 | 7/2016 | |
| JP | 2010/216317 A | 9/2010 | |
| KR | 20090132080 A | 12/2009 | |
| WO | WO-2012/048718 A1 | 4/2012 | |
| WO | WO-2012/048719 A1 | 4/2012 | |
| WO | WO-2017/131515 A1 | 8/2017 | |
| WO | WO-2017131515 A1 * | 8/2017 | ............ E21B 17/02 |
| WO | WO-2019/195322 A1 | 10/2019 | |

OTHER PUBLICATIONS

International Search Report and Written Opinion for International Application No. PCT/US2019/025429 dated Jun. 24, 2019.
International Search Report and Written Opinion for International Application No. PCT/US2019/025432 dated Jun. 20, 2019.
International Search Report and Written Opinion for International Application No. PCT/US2019/025442 dated Jun. 18, 2019.
Extended European Search Report for EP Application No. 19781550.9 dated Nov. 29, 2021.
Suppplementary European Search Report for EP Application No. 19780950 dated Dec. 15, 2021.
Suppplementary European Search Report for EP Application No. 19781091 dated Dec. 15, 2021.
Extended European Search Report for EP Application No. 19781696 dated Jan. 11, 2022.

* cited by examiner

WIND TURBINE BLADE ROTATING DEVICE—STRAPPED TIP DEVICE WITH BLADE STABILIZATION SYSTEM

CROSS-REFERENCE TO RELATED APPLICATIONS

This application is a Continuation of and claims the benefit under 35 USC 120 to U.S. patent application Ser. No. 16/373,344 filed Apr. 2, 2019, and claims the benefit under 35 USC 119 of priority to U.S. Provisional Application Nos. 62/651,601, 62/651,588, 62/651,586 and 62/651,581 filed Apr. 2, 2018, the entire contents of each are hereby incorporated by reference.

BACKGROUND OF THE DISCLOSED SUBJECT MATTER

Field of the Disclosed Subject Matter

The disclosed subject matter relates to a wind turbine rotor blade handling system and apparatus for moving a wind turbine rotor blade, and a corresponding method of operating such a handling system.

Description of Related Art

A variety of methods and systems are known for use in the manufacturing process of wind turbine blades, including carts acting to support a section of the wind turbine blade, e.g. after removal from the blade mold, and during post molding operations (e.g. external blade surface grinding or coating operations).

Conventional blade carts comprise an enclosed ring structure which is fitted around the body of the blade. However, as blade dimensions increase, these carts are often difficult to mount to the blade. Often times a crane is required to support the blade weight while the cart is moved (often manually) along the blade. In addition the cart presents a hazard during post molding operations where people and equipment are hindered by the large ring, and prevented from easily accessing the blade leading and trailing edges at the location of the cart.

Conventional blade carts are configured with closed brackets forming a closed ring into which the wind turbine blade is introduced. The drawback of this configuration lies in the operation of loading the blade into the cart since to perform the loading step either the cart must be moved from the tip of the blade to the position of the blade where the cart can support the blade weight, or the blade must be moved into the cart by means of using an overhead travelling crane and cables. In addition to the undesirable complexity of such conventional blade handling systems, operation of these conventional systems require a variety of movements which present high risk of blade damage when introducing and removing the various components.

Some exemplary conventional blade handling systems are disclosed in WO 2013092597, WO 2012048719, US 20140356113, EP 2584191, JP2010216317, each of which is hereby incorporated by reference it its entirety, including the particular blade contacting elements and relative range of motions disclosed.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a wind turbine blade suspension device comprising: a blade housing, the blade housing configured to receive a blade therein, the blade housing including at least one guide on an exterior surface; a base; a first adjustable frame disposed on a first side of the base; a second adjustable frame disposed on a second side of the base; at least one adjustable strap, the adjustable strap disposed between the adjustable frames; wherein the at least one strap extends through the guide on the exterior surface of the housing to suspend the blade.

In some embodiments, the adjustable frames have a non-linear shape.

In some embodiments, each adjustable frame includes a pair of spaced struts having a bottom and top end, the top ends of the first and second frames disposed in closer proximity than the bottom ends of the first and second frames.

In some embodiments, the adjustable frames are configured to adjust the height of the strap(s) in a telescopic manner.

In some embodiments, each adjustable frame includes a pair of spaced struts having a bottom and top end, with a cross-beam extending between adjacent struts proximate the top end.

In some embodiments, the adjustable strap(s) extend around less than the entire surface of the blade housing.

In some embodiments, the adjustable strap(s) extend around the leading edge of the blade housing.

In some embodiments, the housing is configured as a multi-piece component having an open configuration for receiving the blade and a closed configuration.

In some embodiments, the strap(s) are adjustable to change the height of the blade.

In some embodiments, the device also includes a propulsion mechanism for rotating the wind turbine blade.

In accordance with another aspect of the disclosure, a wind turbine blade suspension device comprising: a blade housing, the blade housing configured to receive a blade therein, the blade housing including at least one guide on an exterior surface; a base; a first pair of telescopic frames disposed on a first side of the base; a first cross beam extending between the first pair of telescopic frames; a second telescopic frame disposed on a second side of the base; a second cross beam extending between the second pair of telescopic frames; at least one adjustable strap, the adjustable strap extending from the base and disposed between the telescopic frames; wherein the at least one strap extends through the guide on the exterior surface of the housing to suspend the blade.

In some embodiments, the telescopic frames have an arcuate shape.

In some embodiments, the strap is disposed between the first pair of telescopic frames.

In some embodiments, the strap is disposed between the second pair of telescopic frames.

In some embodiments, the apparatus also includes an actuator coupled to at least one telescopic frame, the actuator extending the telescopic frame from a lowered position to an extended position.

In some embodiments, the actuator is attached to the first cross beam and the second cross beam.

In some embodiments, the apparatus also includes a plurality of casters, the casters attached to the frame.

In some embodiments, the strap(s) are adjustable to change the height of the blade.

In some embodiments, the apparatus also includes a propulsion mechanism for rotating the wind turbine blade.

In some embodiments, the strap surrounds the leading edge of the blade.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

FIGS. 4-5, 7 and 9-10 depict the Tip Device of the present disclosure without the straps for clarity of the underlying structure of the apparatus.

DETAILED DESCRIPTION OF AN EXEMPLARY EMBODIMENT

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

Reference will now be made in detail to exemplary embodiments of the disclosed subject matter, an example of which is illustrated in the accompanying drawings. The method and corresponding steps of the disclosed subject matter will be described in conjunction with the detailed description of the system.

The methods and systems presented herein may be used for handling, e.g. clamping, securing, rotating and transporting a wind turbine blade. The system and apparatus disclosed herein can be used to facilitate various finishing processes of the wind turbine blade manufacturing. In an exemplary embodiment, this system consists of two separate apparatus called "Root Device" and "Tip device" as shown within the figures included herein.

Figure 1:
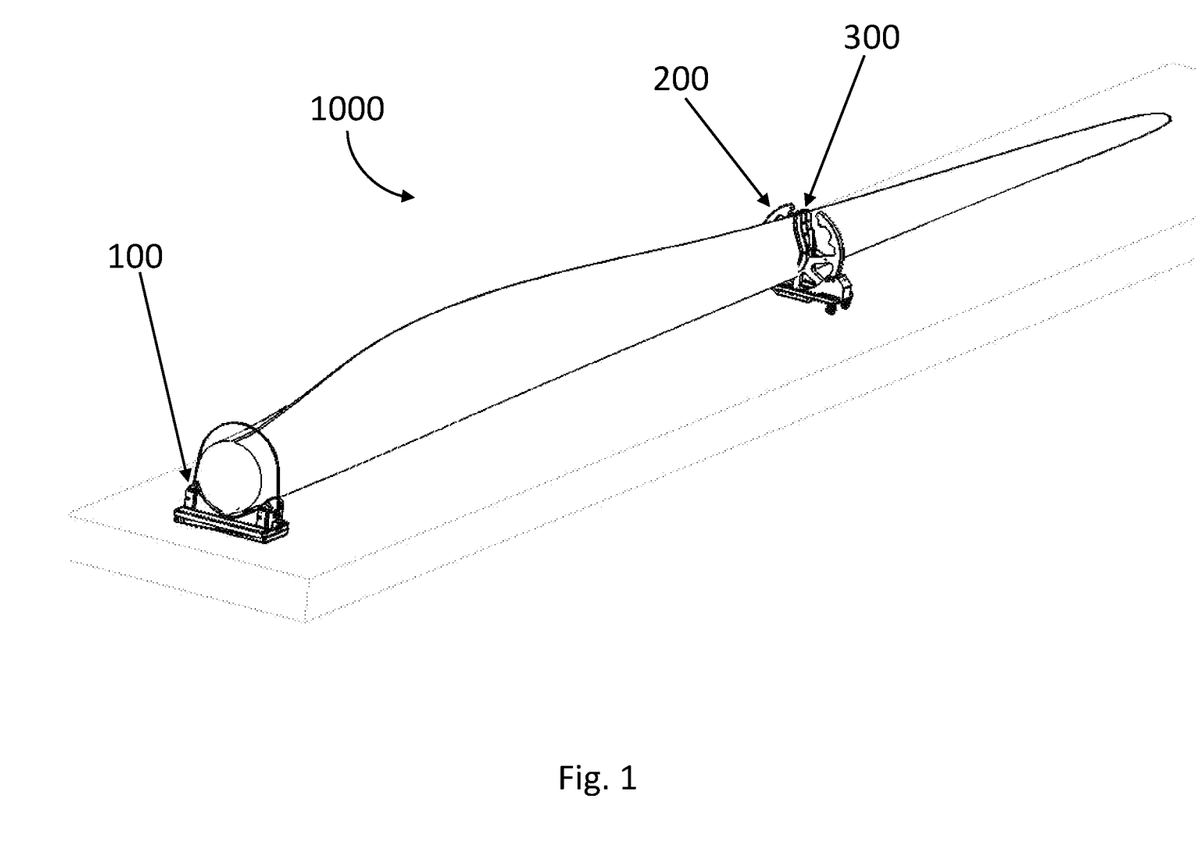
FIG. 1 is a schematic representation of a wind turbine blade mounted to the handling system disclosed herein.

As shown in FIG. 1, the system 1000 generally includes a Root Device (100) and a Tip Device (200). These subsystem 100, 200 provide additional handling functions and the ability to handle larger wind turbine blades with higher efficiency, accessibility and ergonomics than conventional handling systems. It will be understood that although reference to a "tip device" is recited herein, the apparatus and methods disclosed herein can be employed to engage any portion of the blade (i.e. not just the tip portion, but any location along the blade span).

Blade Handling Device (200)

The strapped blade suspension handling device (1000) with blade stabilization system is a one aspect of the wind turbine blade rotating device disclosed herein. This structure's aim is achievement of additional functions and opportunities to handle larger wind turbine blades with easy loading process, higher efficiency of accessibility and ergonomic rather than conventional systems.

The system disclosed herein has the following sub-systems: i) Special shaped composite blade template, ii) Double strapped blade tip rotation system, iii) Telescopic side column system, iv) Blade strap adjustment system and v) Blade stabilization system; each of which is described in further detail below.

Special Shaped Composite Blade Template

The blade suspension device (200) includes composite blade housing template (300) which serves as a sleeve or shroud to receive the wind turbine blade therein, as shown in FIGS. 1-11. The template (300) can be formed as a two-piece component which is secured, e.g. clamped, together to securely retain the blade within. The pieces can be hinged together in a clamshell fashion, or be separate pieces which are releasably coupled together and securely locked to retain the blade during various modes of movement. The interior surface of the template (300) can include a coating or layer of material which cushions or protects the blade surface from damage. The exterior surface of the template (300) includes a series of grooves or channels for receiving and guiding the straps which suspend and rotate the blade, as described in further detail below. In the exemplary embodiment shown in FIG. 2, the template (300) completely surrounds the blade (not shown for clarity) from leading edge to trailing edge. Likewise, the grooves/channels extend completely around the template (300) so that the blade can be rotated 360 degrees (or more) while continuously engaged with the straps. While the templates (300) can be sized according to specific blade geometries and sizes, the remainder of the blade suspension device (200) can be universal in design an applicable to all wind turbine blades.

The blade suspension device (200) includes a base (210) and a support frame telescopic columns (220), as shown in FIGS. 2-11. The blade suspension device (200) can be a single, integral unit, or can be comprised of a plurality of discrete units which can be joined together or otherwise connected to receive and support a wind turbine blade. For example, the frame (220) can be a two-piece structure that is releasably joined and locked together with a clamp or pin. The two pieces can be joined along the bottom via interconnecting struts that extend underneath the blade.

The support base (210) has load-bearing beams and, optionally, casters to permit movement of the blade suspension device (200) about the shop floor. In the exemplary embodiment shown, the beams are arranged in a parallel manner to define a box-like frame which is open and accessible from above and below. Extending upwardly from the base (210) are telescopic columns (220), which are configured with an arcuate, e.g. elliptical, shape such that the bottom is connected to the edge of the base (210) and the tops converge near the midpoint of the blade suspension device. This arcuate shape is advantageous in that it brings the hinge point of the support straps, about the cross-beam (222) proximate the center point of the blade suspension device (200) which is where the blade is supported. Thus the center of gravity is proximate the midpoint of the, symmetrical, apparatus. Furthermore, the arcuate shape and telescopic columns allow for sufficient space to permit rotation of the blade, as described in further detail below.

As previously noted, the telescopic columns (220) also have cross-beams (222) extending between adjacent telescopic columns (220) at opposite ends of the blade suspension device (200). A series of cross beams also extend between parallel beams of the base (210). Additionally, the telescopic columns (220) include panels (223) which sandwich and guide the telescopic columns (220), and in combination with the cross-beams (222), provide additional support and rigidity to the Tip Device. The cross beams can be adjustable such that the space between the columns (220), and the front and rear struts of the base (210), can be collapsed or expanded as desired to accommodate blades of varying geometries.

The blade suspension device (200) includes grooves or channels for receiving and guiding the belts or straps that are employed to lift and suspend the blade. It should be understood that the telescopic columns (220) can be positioned at any desired location along the blade span and need not be located proximate the absolute tip of the blade.

In operation, if access to the blade tip surface which is contained within the blade suspension device (200) is required, a second blade suspension device (200) can be brought into adjacent position to similarly receive the blade tip. Thereafter, the first blade suspension device (200) can be removed while the second blade suspension device (200) maintains the blade in the suspended position.

Double Strapped Blade Tip Rotation System

The blade suspension device (200) operates to support, and rotate, the blade via belts or straps (250). Similarly to the templates (300), the straps (250) can include a coating or layer of material which cushions or protects the blade surface from damage. In the embodiments shown, a dual strap arrangement is used, though alternative numbers of straps can be employed within the currently disclosed system.

The blade suspension device (200) is provided with freedom of movement within the tilt and yaw directions. For example, a strap tension adjusting feature can be provided in which the strap tension adjusting mechanism is positioned below a side column (220) behind panels (223). This system will measure the straps tension relative to each other and will balance the tension to avoid strap loosening during blade rotation. In the exemplary embodiment shown in FIG. 3, the straps (250) are guided, and slidably retained, within channels (302) which protrude outwardly from the template (300). The template (300) which retains the blade therein (not depicted for clarity sake) rests on the straps (250) such that the straps wrap around the leading edge of the template (300) and extend over only a portion of the upper and lower surfaces of the template. In other words, the straps do not engage the template (300) from approximately the mid-chord position to the trailing edge.

Figure 6:
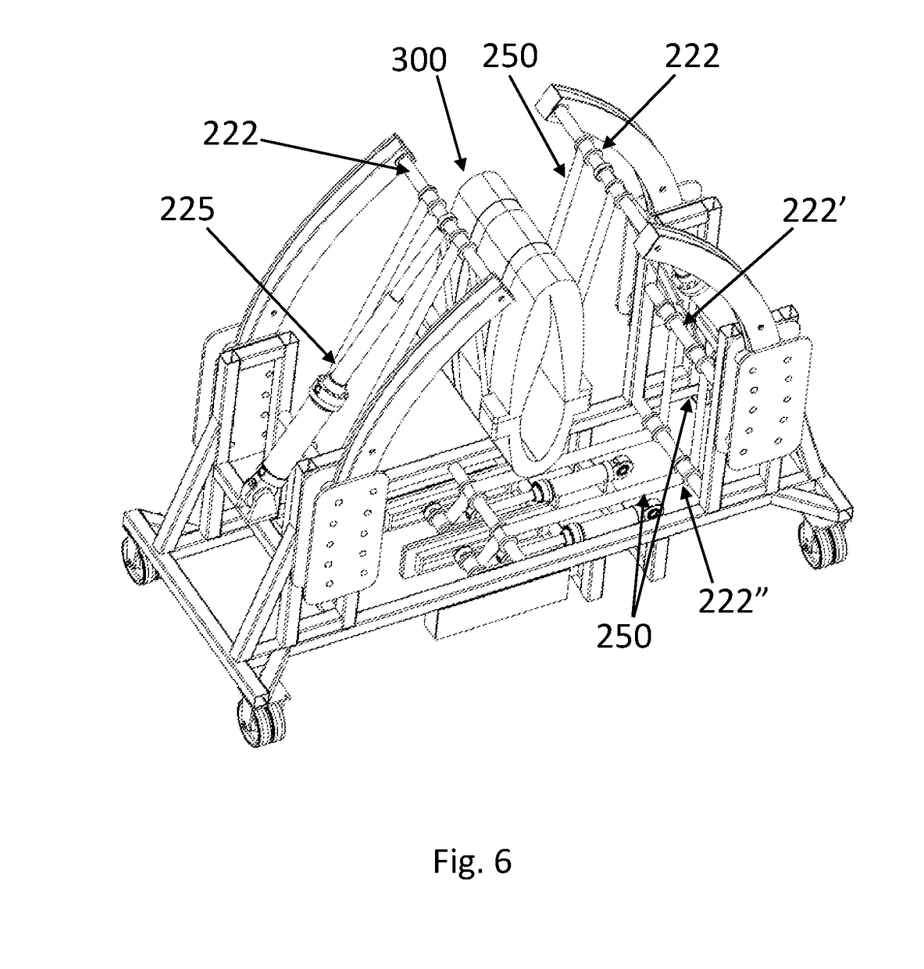
Figure 7:
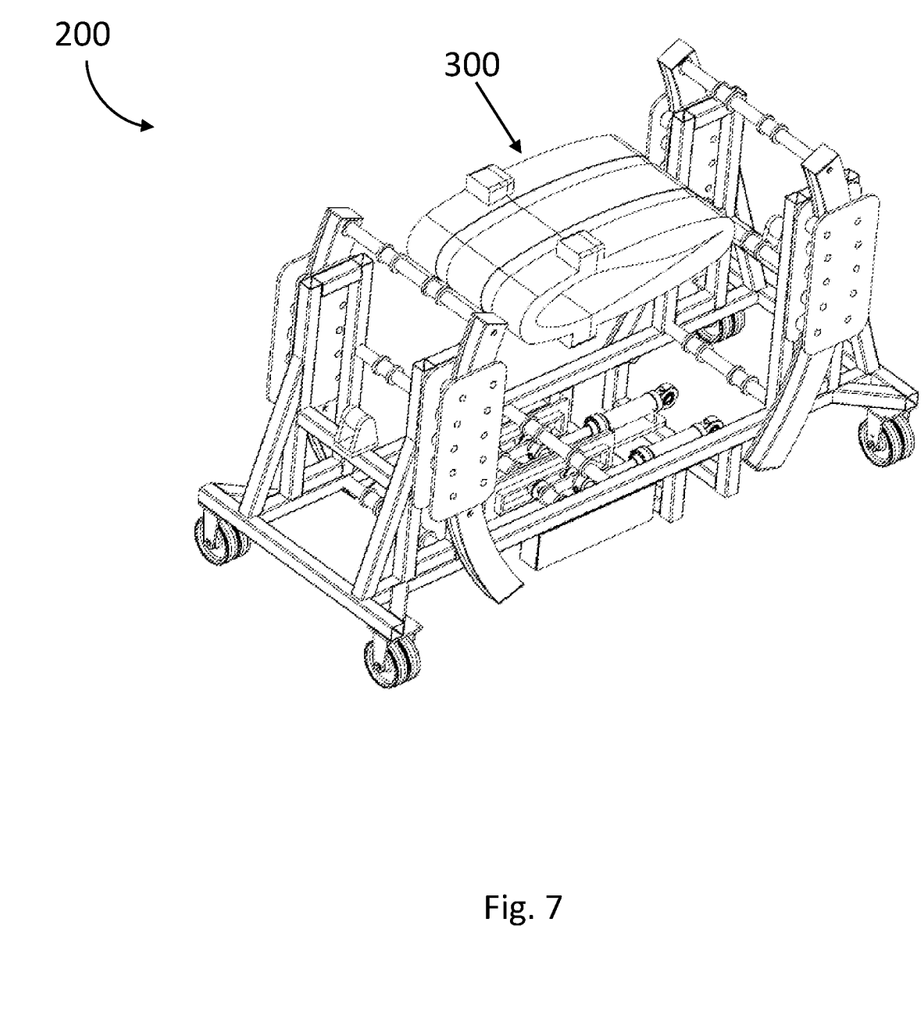

The straps (250) are wrapped around the top cross beam (222) and extend downwardly towards the base (210) to wrap around the middle cross beam (222'), and next around lower cross beam (222"), as shown in FIG. 6. In accordance with another aspect of the disclosure, the straps (250) are adjusted in length, e.g. elongated and retracted, via rollers and bearings, as described in further detail below. Accordingly, the strap suspension system disclosed herein does not require a propulsion means to power the operation of the apparatus (i.e. rotate the blade). However, if so desired, a separate propulsion means can be incorporated into the systems disclosed herein.

Telescopic Side Column System

In accordance with another aspect of the disclosure, the blade suspension device (200) can be configured as an adjustable structure which converts from an extended position (FIGS. 1-3, 6 and 8-11), operational to receive, suspend, and rotate a wind turbine blade, and a collapsed position (FIGS. 4-5 and 7), e.g., for blade loading/unloading. In the exemplary embodiment shown in the tip telescopic columns (220) is adapted to collapse in a telescoping manner which minimizes the size of the entire device.

The telescopic columns (220) is converted between the extended and collapsed positions by a piston (225) which is attached at a lower end to the lower cross beam (222') and at the top end to the upper cross beam (222), as shown in FIG. 6. The pistons (225) can be selectively, and independently of each other, actuatable to advance and retract within the tip telescopic columns (220). The pistons (225) can be actuated via electrical, pneumatic or hydraulic means. Further, the pistons (225) can include a connection mechanism (e.g. clasp, clamp, ring, etc.) to securely and releasably attach to the cross beams (222).

In operation, the telescopic columns (220) can be set in the collapsed configuration for receipt of a turbine blade (having the template 300 attached at the desired location along the blade span). The straps (250) are positioned within the channels//slots (302) on the exterior surface of the template (300). The pistons (225) are then actuated to extend the telescopic columns (220) upwardly, thereby bringing the straps (250) under tension as they lift and suspend the blade therein. Sensors can be embedded within the telescopic columns (220) so that the expansion process can be controlled by a programmable PLC software system. Additionally, alarms (e.g. audible/optical/tactile) can be employed to alert personnel that the device is transitioning and/or near the end of its telescopic range of motion.

Blade Strap Adjustment System

Figure 2:
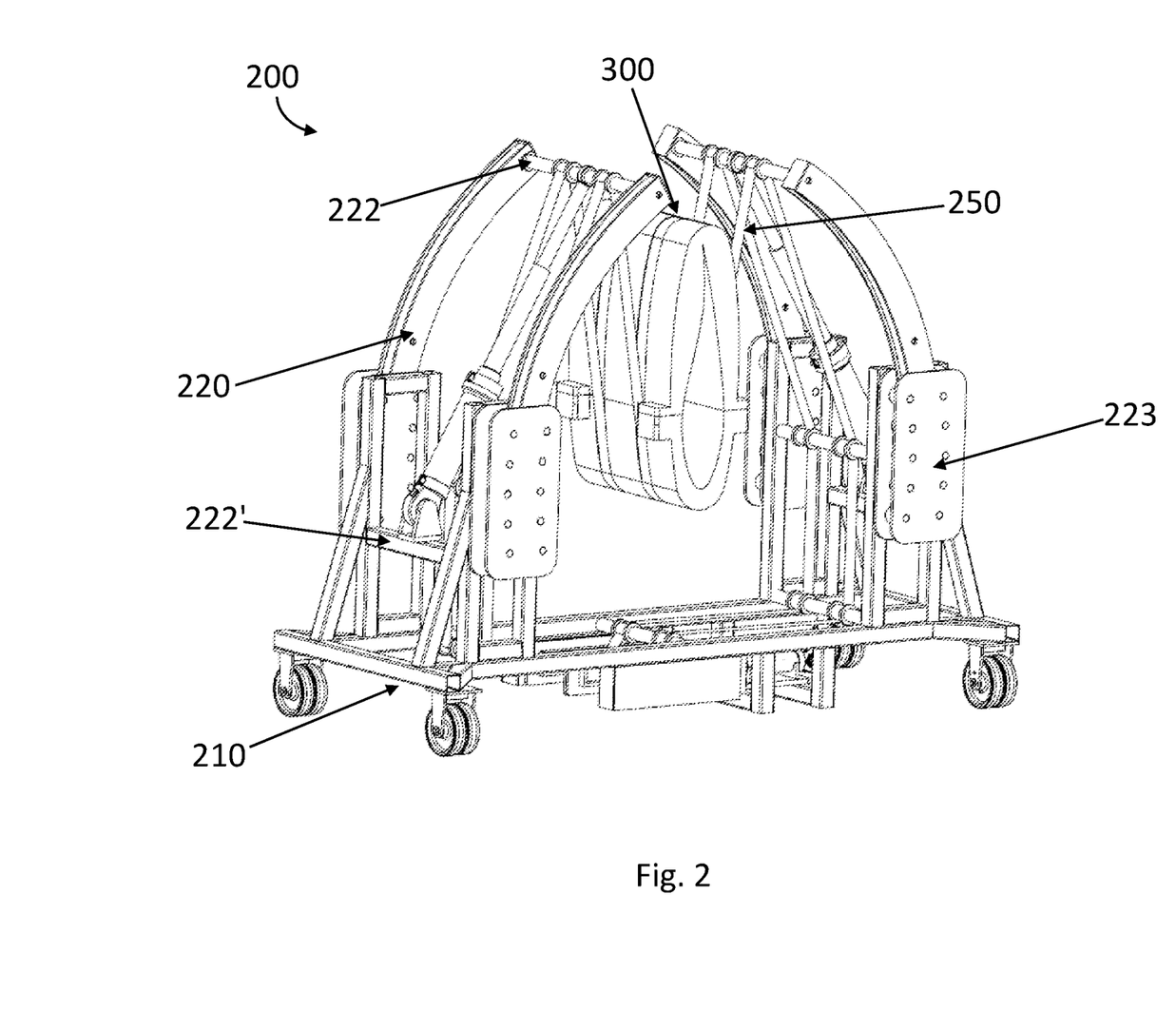
FIG. 2 is a schematic representation of a wind turbine blade mounted to the tip device disclosed herein.
Figure 3:
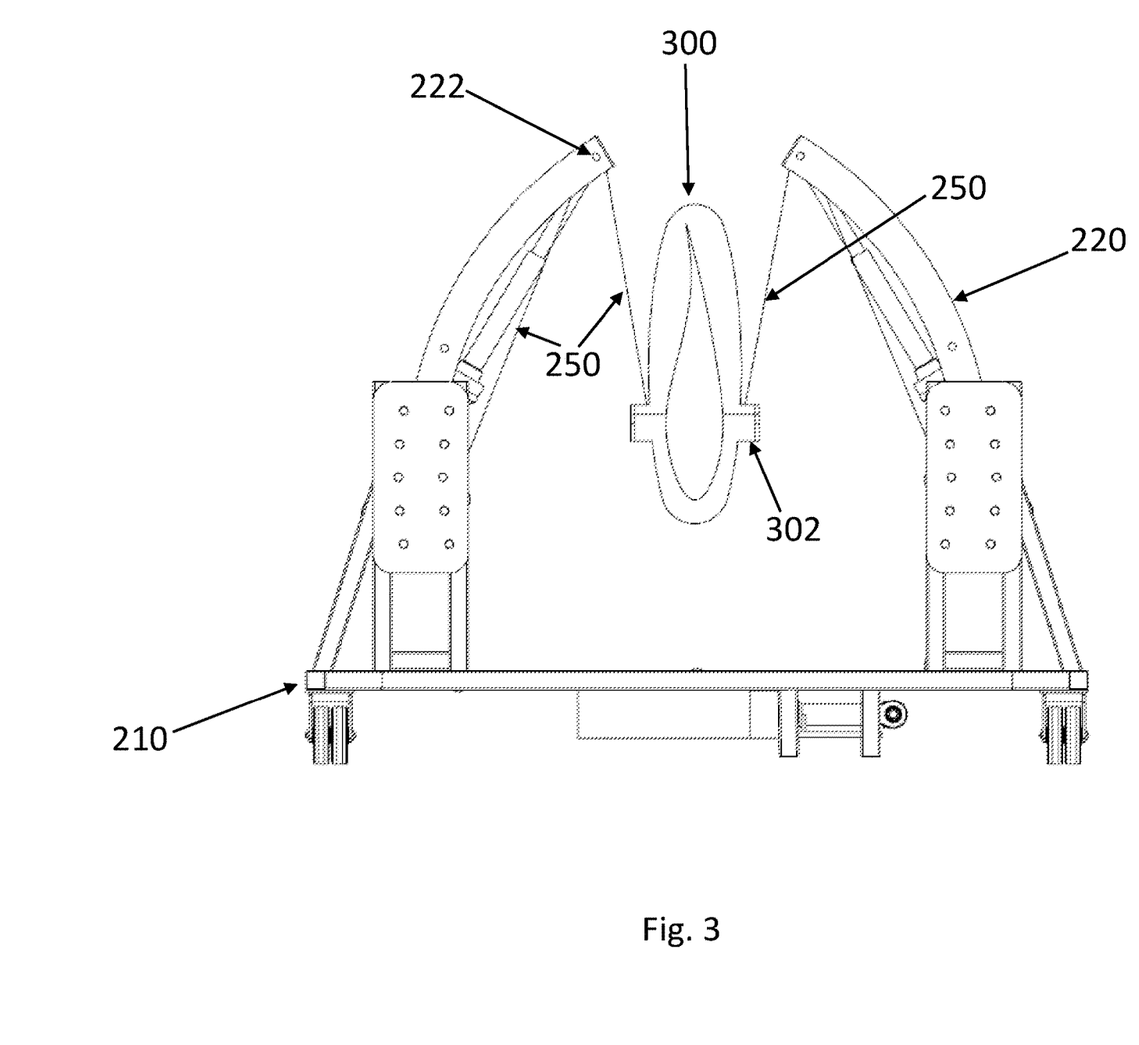
FIGS. 3-11 are a schematic representations of the tip device disclosed herein, shown rotating a blade about various positions with respect to a longitudinal axis of the blade.
Figure 4:
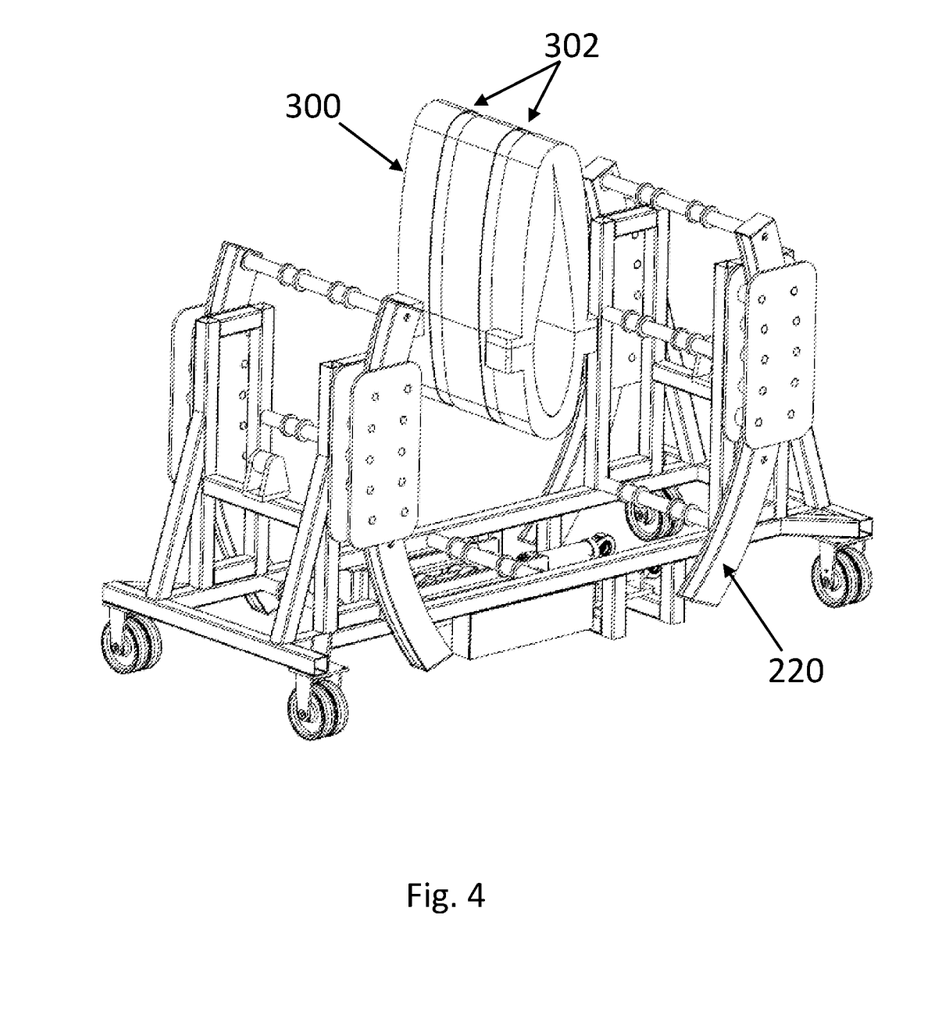
Figure 5:
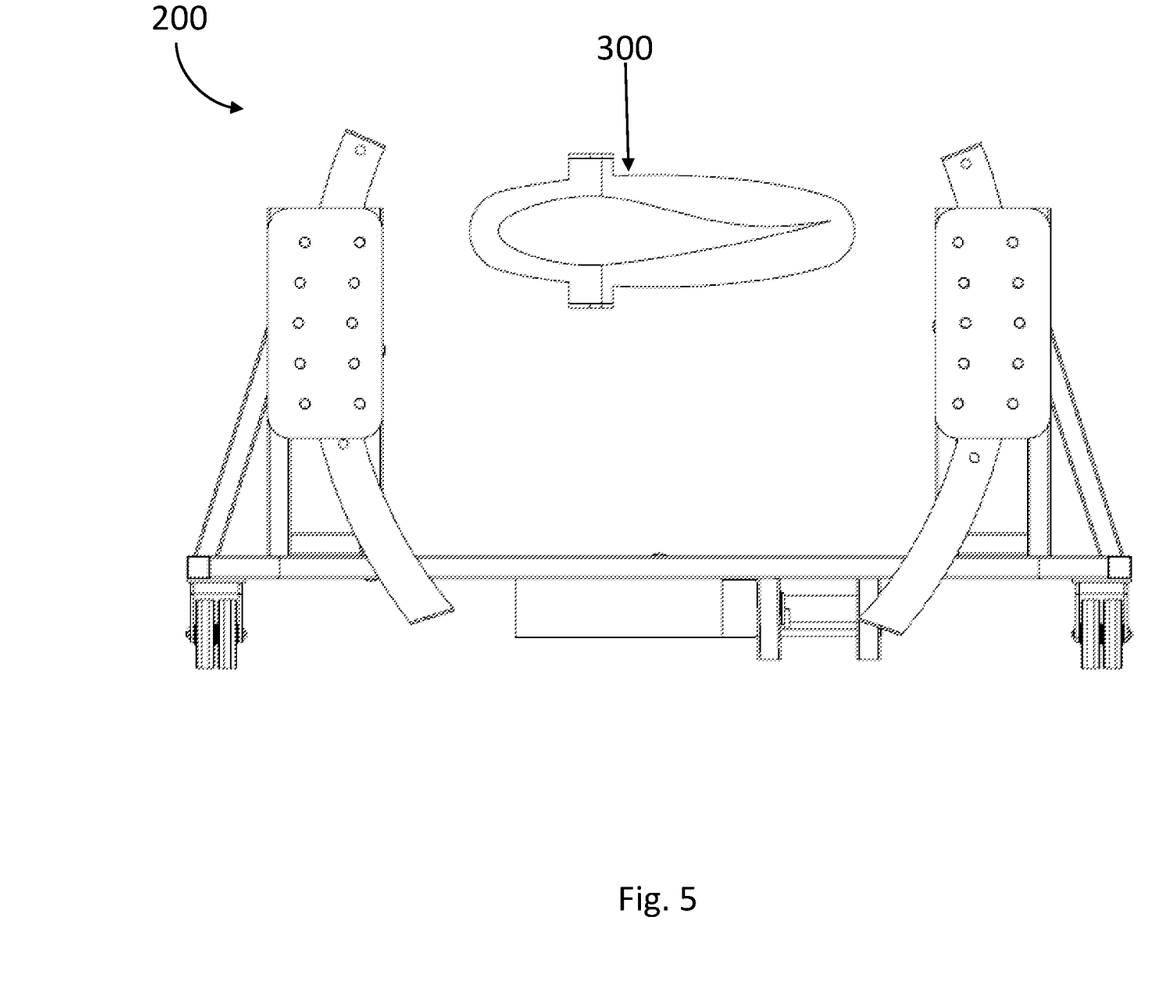
Figure 8:
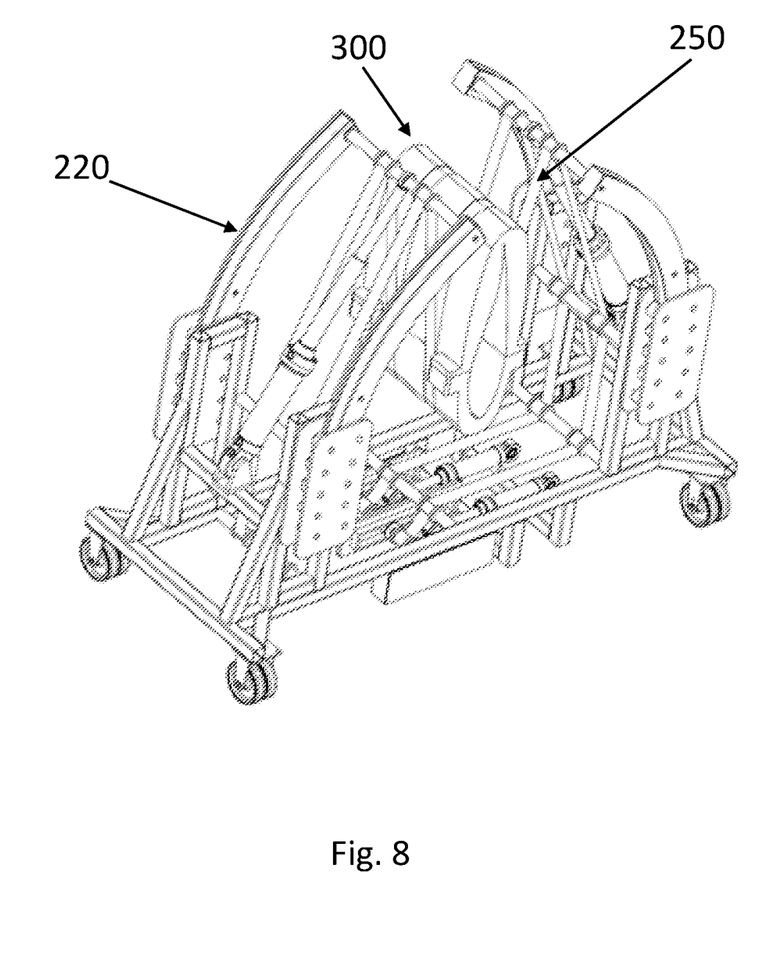
Figure 9:
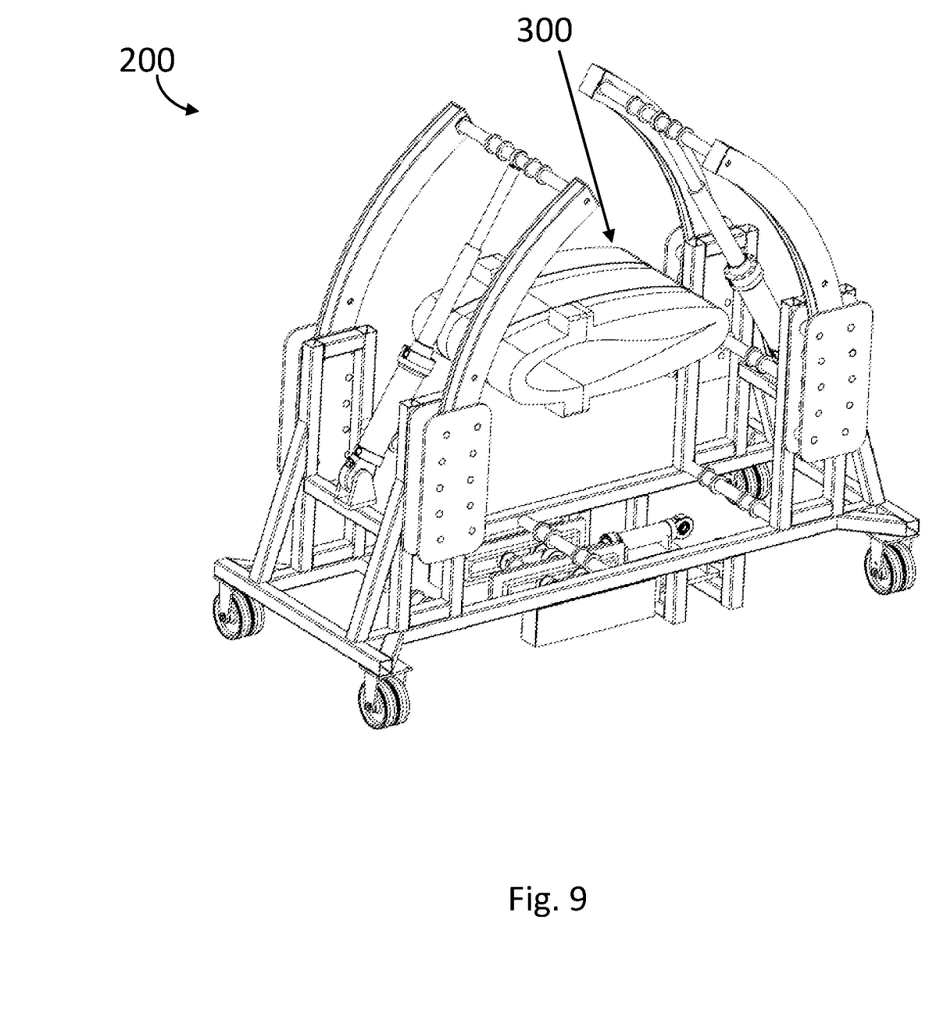
Figure 10:
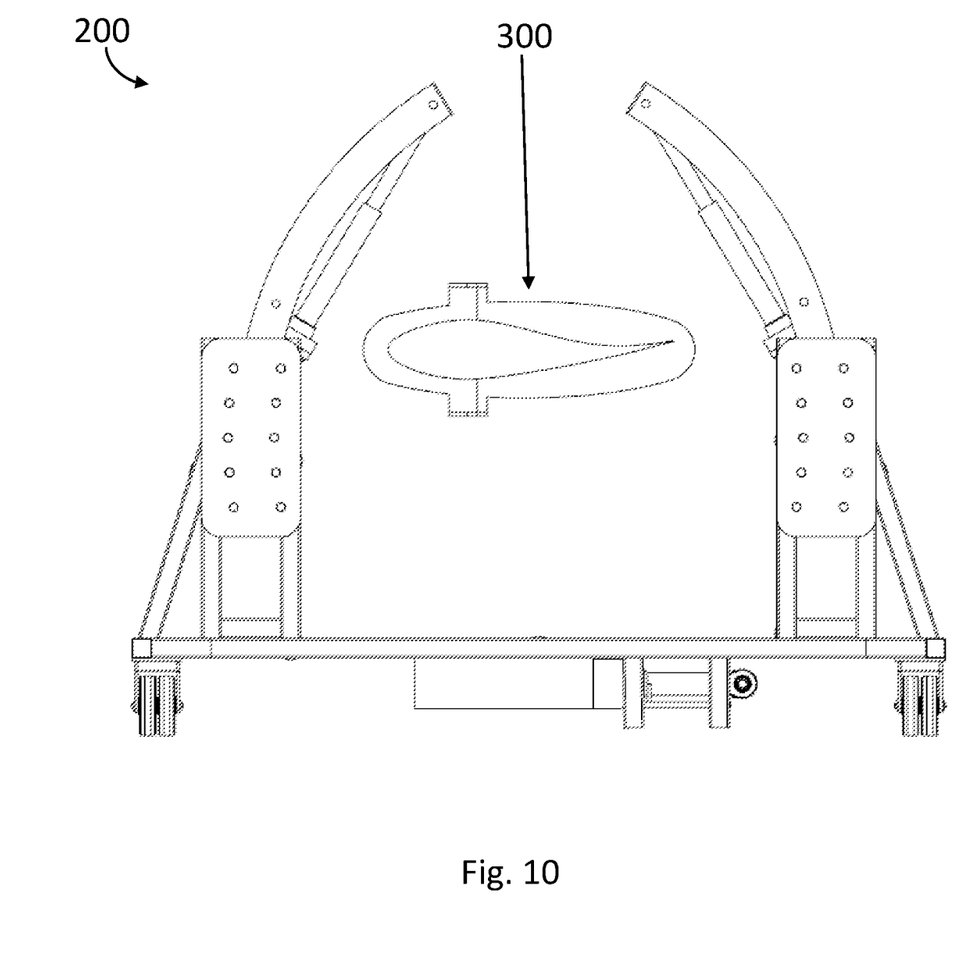
Figure 11:
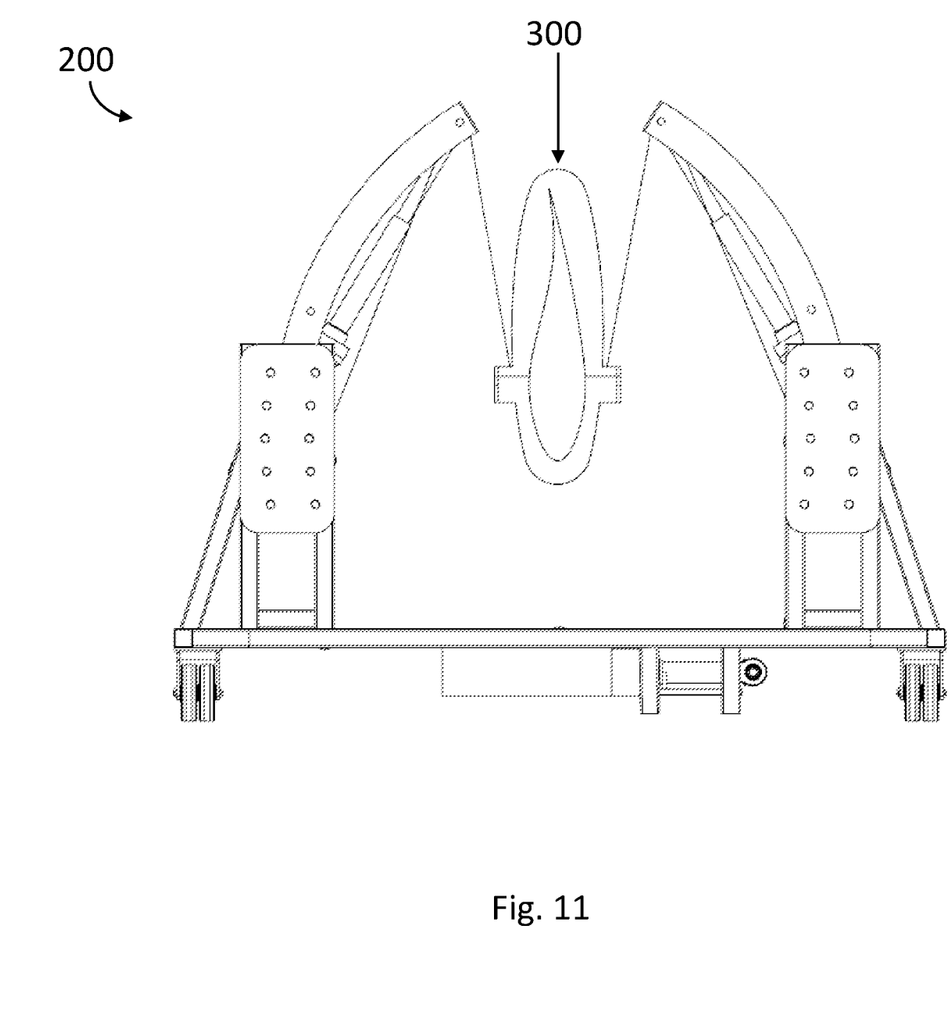

In accordance with another aspect of the disclosure, a blade strap (250) length adjustment system is provided, which in the embodiment shown in FIGS. 2, 6 and 8, is located under the frame (210). In some embodiments, the box-like frame (210) can be an enclosed structure, in which case the strap adjustment can be retained therein. A strap length adjustment system is provided which can increase or decrease the route/length of the straps at bottom of the device, in order to shorten or lengthen the straps at middle area where the blade stands. Quantity and length of the strap adjustment systems' cylinders is calculated according to the blade size and rotation positions.

Strap adjustment can be provided according to the telescopic columns (220) loading and blade rotation positions. Additionally or alternatively, the straps can be adjusted to provide the requisite amount of blade stabilization, even during rotation of the blade from the Root Device (100). Also, the straps can be adjusted according to the blade height and loading/unloading conditions. In accordance with an aspect of the disclosure, there is no necessity for propulsion/energy/drive system for rotating the blade within this system. Each strap is configured as a ring and is freely movable via their bearings (e.g. an operator can generate rotation by manually pulling the straps). When the root device operates (e.g. rotating the blade), tip device will freely rotate in sync with the root device. However, in order to provide blade stabilization, a drive system is provided for strap length adjustment.

Blade Stabilization System

In accordance with another aspect of the disclosure, a blade stabilization system can be employed which monitors and controls the operation of each subsystem described herein. For example, PLC control software can be programmed such that the telescopic frame (222), strap adjustment, and blade rotation are all configured to operate simultaneously. Alternatively, a control can be set to enable only a single subsystem to operate at a given time, requiring serial completion of each task before commencing a subsequent task.

Similarly, boundary limits and conditions can be set so as to slow, or halt, operation of any subsystem disclosed herein.

Root Device (100)

The Root Device (100) can be a single, integral unit, or can be comprised of a plurality of discrete units which can be joined together or otherwise connected to receive and support a wind turbine blade. The Root Device (100) is adapted to receive the root portion of the wind turbine blade, and to rotate the blade (at various speeds). Accordingly, the root support member is configured with a complimentary shape to the wind turbine root, e.g. arcuate. The root support member can comprise a curved shape with a radius which is similar to the outer radius of the root portion. In more general terms, the shape of the root supporting member is adapted to the shape of the root portion. In some embodiments the root support member 120 can be adjustable to accommodate varying root geometries.

The power to generate the movement (e.g. rotation about the blade longitudinal axis) of the wind turbine blade can be provided in a variety of ways, e.g. electric motor, pneumatic or hydraulic systems. In some embodiments, the power means (and associated wiring, cables or piping, as the case may be) are housed directly within the Root Device. In other embodiments, the power source, and/or auxiliary power systems, can be located external to the Root Device (100) housing. In some embodiments, the Root Device can drive the rotation of the blade while the Tip Device passively rotates as the rotational moment is transferred though the blade and into the Tip Device.

In accordance with another aspect of the present disclosure, the root device (100 and blade suspension device (200) can be arranged as separate and independently operable components. In some embodiments the root device and blade suspension device can include position indicating mechanisms which convey the relative position of one component with respect to another. For example, an optical, e.g. laser, mechanism can be included which alerts the user when the root device and blade suspension device are properly aligned (e.g. with respect to the blade longitudinal axis). If the blade suspension device were accidentally displaced, an alarm can notify the user to take corrective action to bring the blade suspension device back into alignment so as to not induce any undesired loads on the blade, or support apparatus. Preferably, the system disclosed herein is synchronized with the root device and blade suspension device coordinated to move, e.g. rotate, at the same time and at the same speeds.

Moreover, the Root Device and Tip Device can be configured to restrict relative movement therebetween, such that each apparatus moves in concert with the other (e.g. relocated along a shop floor) without imparting any loads on the blade disposed therein.

It will be understood that once the blade is supported within the root device and blade suspension device any external support means, e.g. a harness, a crane, etc., for the blade can be removed. In some embodiments, the portions of the apparatus which engage the blade (or core) can include a protective cover to prevent damage and further absorb or cushion against undesired load transfer. Embodiments of the wind turbine blade handling system as described above may be flexible and can adapt to various rotor blade positions. This can result in smaller loads on the rotor blade. As a consequence, the risk of damages to the rotor blade is reduced.

Accordingly, the present disclosure provides a variety of improvements and benefits to wind turbine blade handling, some examples include:
1. Easy loading/unloading of the blade.
2. Different tip support locations for same blade can be obtained with same device.
3. Lower tip device height.
4. Easy mobility with less weight.
5. Universal design, only template variations needed to accommodate different blades.
6. Tip device lifting and lowering ability.
7. Larger blade's rotation angles and surface accessibility will be increased.
8. Blade will undergo less stress during rotation.
9. System is self-aligned so ne need of pre-adjustment.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:
1. A wind turbine blade suspension device comprising:
  a blade housing, the blade housing configured to receive a blade therein, the blade housing including at least one guide on an exterior surface;
  a base;
  a first adjustable frame disposed on a first side of the base, the first adjustable frame including a pair of spaced columns, each column having a bottom and top end, the top ends defining a first hinge point;

a second adjustable frame disposed on a second side of the base, the second adjustable frame including a pair of spaced columns, each column having a bottom and top end, the top ends defining a second hinge point;

at least one adjustable strap, the adjustable strap disposed between the adjustable frames and extending over at least one hinge point;

wherein the device has an expanded position and a collapsed position, the first hinge point and the second hinge point spaced apart by a first distance when the device is in the expanded position, and the first hinge point and the second hinge point spaced apart by a second distance when the device is in the collapsed position; and wherein the at least one strap extends through the guide on the exterior surface of the housing to suspend the blade; and wherein the first distance that the first hinge point and the second hinge point are spaced apart is lesser than the second distance the first hinge point and the second hinge point are spaced apart.

2. The wind turbine blade suspension device of claim 1, wherein the adjustable frames have a non-linear shape.

3. The wind turbine blade suspension device of claim 1, wherein the adjustable frames are configured to adjust the height of at least one strap.

4. The wind turbine blade suspension device of claim 1, wherein each adjustable frame includes a pair of spaced struts having a bottom and top end, with a cross-beam extending between adjacent struts proximate the top end.

5. The wind turbine blade suspension device of claim 1, wherein at least one strap extends around less than the entire surface of the blade housing.

6. The wind turbine blade suspension device of claim 1, wherein the at least one strap extends around the leading edge of the blade housing.

7. The wind turbine blade suspension device of claim 1, wherein the housing is configured as a multi-piece component having an open configuration for receiving the blade and a closed configuration.

8. The wind turbine blade suspension device of claim 1, wherein at least one strap is adjustable to change the height of the blade.

9. A wind turbine blade suspension device comprising:
a blade housing, the blade housing configured to receive a blade therein, the blade housing including at least one guide on an exterior surface;
a base having a top surface and a bottom surface;
a first pair of telescopic frames disposed on a first side of the base, each of the first telescopic frames having a bottom and top end;
a second pair of telescopic frames disposed on a second side of the base, each of the second telescopic frames having a bottom and top end;
wherein the device has an expanded position and a collapsed position, the top end of the telescopic frames disposed above the base when the device is in the expanded position, and the bottom end of the telescopic frames disposed below the bottom of the base when the device is in the collapsed position;
at least one adjustable strap, the adjustable strap extending from the base and disposed between the telescopic frames;
wherein the at least one strap extends through the guide on the exterior surface of the housing to suspend the blade.

10. The wind turbine blade suspension device of claim 9, wherein the telescopic frames have an arcuate shape.

11. The wind turbine blade suspension device of claim 9, wherein the strap is disposed between the first pair of telescopic frames.

12. The wind turbine blade suspension device of claim 9, wherein the strap is disposed between the second pair of telescopic frames.

13. The wind turbine blade suspension device of claim 9, further comprising an actuator coupled to at least one telescopic frame, the actuator extending from a lowered position to an extended position.

14. The wind turbine blade suspension device of claim 13, wherein the actuator is attached to a cross beam extending between the pair of telescopic frames.

15. The wind turbine blade suspension device of claim 9, further comprising a plurality of casters, the casters attached to the frame.

16. The wind turbine blade suspension device of claim 9, wherein at least one strap is adjustable to change the height of the blade.

17. The wind turbine blade suspension device of claim 9, wherein the strap surrounds the leading edge of the blade.

* * * * *